2,770,526
METHOD FOR PURIFYING METAL HALIDES

Horace N. Lander, Topsfield, Mass., assignor to Metal Hydrides Incorporated, Beverly, Mass., a corporation of Massachusetts No Drawing. Application December 19, 1955,
Serial No. 553,704

3 Claims. (Cl. 23—90)

The United States patent to Peter P. Alexander No. 2,702,234, dated February 15, 1955, describes a method for producing calcium hydride by reacting sodium metal with anhydrous calcium chloride in an atmosphere of hydrogen at a temperature between about 420° C. and 600° C. The reaction is illustrated by the equation (1)    $2Na + CaCl_2 + H_2 \rightarrow CaH_2 + 2NaCl$ The calcium hydride produced by this method is very finely divided and extremely reactive and may be used without removal of the sodium chloride for reducing titanium tetrachloride to produce titanium hydride as illustrated by the equation (2)    $2(CaH_2 + 2NaCl) + TiCl_4 \rightarrow$
$TiH_2 + 2CaCl_2 + 4NaCl + H_2$ By heating the reaction products of Equation 2 at a temperature of 800° to 900° C. the hydrogen may be removed to produce titanium metal in the form of a powder. A ductile titanium metal can be produced by this method if the anhydrous calcium chloride used in producing the calcium hydride as illustrated by Equation 1 is chemically pure. The cost of chemical pure calcium chloride presently available prohibits its use as above described. The cheaper grades of calcium chloride available contain impurities, such as carbon, boron, oxygen, silicon and sulfur, and if used as above described find their way into the titanium metal produced and render it less ductile.

The present invention contemplates a method for purifying calcium chloride to remove impurities, such as carbon, boron, oxygen, silicon and sulfur, and produce an anhydrous calcium chloride which is suitable for use as above described to produce ductile titanium metal.

In accordance with the present invention the impure calcium chloride is dried to render it anhydrous in any suitable manner as by heating in a confined reaction zone at a temperature between about 200° C. and 300° C. The anhydrous calcium chloride thus produced may contain one or more of the compounds boric oxide, calcium oxide, silica, calcium sulfate, calcium carbonate and oxides of iron and aluminum in amounts varying depending upon the source of the impure calcium chloride. This anhydrous product in finely divided form is heated for a sufficient period of time and at a suitable temperature in contact with carbon tetrachloride gas under a pressure of one atmosphere or slightly greater until the impurities have been removed to the desired extent. The undesirable elements, including boron, silicon, iron and aluminum, react with the carbon tetrachloride to form volatile chlorides which are carried away in the gas stream. Other impurities which are removed as gases include oxygen, carbon and sulphur trioxide. In order to prevent deposit of carbon by the thermal dissociation of carbon tetrachloride, the latter must be used in admixture with chlorine in proportions depending upon the temperature used in the chloridizing step. The minimum ratio of chlorine to carbon tetrachloride by volume required at any given temperature can be determined by themodynamic calculations and increases as the temperature used increases. Thus, the minimum ratio of chlorine to carbon tetrachloride by volume required at a temperature of about 425° C. is about 1 to 2 while the minimum ratios required at temperatures of 625° C. and 650° C. are about 11 to 1 and 15.5 to 1 respectively. In the practice of the invention the anhydrous impure calcium chloride may be heated in contact with the chlorine-carbon tetrachloride mixture at a temperature between about 425° C. and 650° C. for at least about 1 to 4 hours. The period of heating is not critical as long as it is sufficiently long to remove the undesired impurities to the desired degree. A higher temperature usually is not practical since the amount of carbon tetrachloride in the required gaseous mixture is extremely low.

The reactions involved in the chloridizing treatment in accordance with the invention are illustrated by the following equations:

(3)    $2B_2O_3 + 3CCl_4 \rightarrow 4BCl_3 + 3CO_2$
(4)    $B_2O_3 + 3CCl_4 \rightarrow 2BCl_3 + 3CO + 3Cl_2$
(5)    $SiO_2 + CCl_4 \rightarrow SiCl_4 + CO_2$
(6)    $SiO_2 + 2CCl_4 \rightarrow SiCl_4 + 2CO_2 + 2Cl_2$
(7)    $2CaO + CCl_4 \rightarrow 2CaCl_2 + CO_2$
(8)    $CaO + CCl_4 \rightarrow CaCl_2 + CO + Cl_2$
(9)    $2CaCO_3 + CCl_4 \rightarrow 2CaCl_2 + 3CO_2$
(10)   $CaCO_3 + 2CCl_4 \rightarrow CaCl_2 + 3CO + 3Cl_2$
(11)   $2CaSO_4 + CCl_4 \rightarrow 2CaCl_2 + CO_2 + 2SO_3$
(12)   $CaSO_4 + CCl_4 \rightarrow CaCl_2 + CO_2 + SO_2 + Cl_2$
(13)   $CaSO_4 + CCl_4 \rightarrow CaCl_2 + CO + SO_3 + Cl_2$
(14)   $CaSO_4 + 2CCl_4 \rightarrow CaCl_2 + 2CO + SO_2 + 3Cl_2$ The calculated standard free enrgy change of each of the above reactions at 800° K. and 1000° K. is as follows using thermodynamic data available and the free energy equation $$\Delta F° = \Delta H° - T\Delta S°$$

where $\Delta F°$ is the standard free energy change in calories per mole, $\Delta H°$ is the standard enthalpy change in calories per mole, T is the absolute temperature and $\Delta S°$ is the standard entropy change:

|  | $\Delta F°$ at 800° K. | $\Delta F°$ at 1,000° K. |
|---|---|---|
| Equation (3) | −151,300 | −182,200 |
| Equation (4) | −51,600 | −95,500 |
| Equation (5) | −35,100 | −53,900 |
| Equation (6) | −39,200 | −70,100 |
| Equation (7) | −149,600 | −158,300 |
| Equation (8) | −74,600 | −83,500 |
| Equation (9) | −130,500 | −147,600 |
| Equation (10) | −56,100 | −86,700 |
| Equation (11) | −35,100 | −55,000 |
| Equation (12) | −59,900 | −77,400 |
| Equation (13) | −14,200 | −31,800 |
| Equation (14) | −53,300 | −114,000 |

These calculations show that each of the reactions illustrated by Equations 3 to 14 inclusive takes place at the temperatures indicated. Similar calculations show that none of the reactions illustrated by the following equations can take place to deposit undesired carbides:

(15)   $SiO_2 + 2CCl_4 \rightarrow SiC + CO_2 + 4Cl_2$
(16)   $SiO_2 + 3CCl_4 \rightarrow SiC + 2CO + 6Cl_2$
(17)   $SiCl_4 + CCl_4 \rightarrow SiC + 4Cl_2$
(18)   $2CaO + 5CCl_4 \rightarrow 2CaC_2 + CO_2 + 10Cl_2$
(19)   $CaO + 3CCl_4 \rightarrow CaC_2 + CO + 6Cl_2$
(20)   $CaCl_2 + 2CCl_4 \rightarrow CaC_2 + 5Cl_2$ Drying the impure calcium chloride to render it anhydrous may be performed in any conventional apparatus such as a rotary kiln. The chloridizing step may be conducted in any apparatus in which the gaseous mixture of chlorine and carbon tetrachloride at a pressure of one atmosphere or slightly greater can be brought in intimate contact with the particles of finely divided anhydrous calcium chloride at the desired temperature and required period of time. A suitable apparatus for this purpose is a fluosolids reactor in which the particles of calcium chloride are maintained in suspension in a fluidized layer by the controlled velocity of the gaseous mixture of chlorine and carbon tetrachloride. Thus, the impure calcium chloride after being rendered anhydrous by heating in a rotary kiln may be fed into the upper portion of a fluosolids reactor and chloridized in accordance with the invention.

If desired, the impure calcium chloride may be dehydrated as well as chloridized in a fluosolids reactor having at least two superimposed fluidizing compartments. Thus, the finely divided calcium chloride may be fed into the top fluidizing compartment where it is heated at a temperature between about 200° C. and 300° C. and then gradually transferred to a lower fluidizing compartment which is heated at the desired chloridizing temperature. In such an apparatus, the time of treatment may be controlled by controlling the rate of feed of the calcium chloride into the apparatus. The slight corrosive action of the material treated may be overcome by lining the reactor with a fused alkali metal halide or alkaline earth metal halide or a fused mixture thereof or with a stable refractory of the titanium carbide type.

The invention is illustrated by the treatment of two samples of impure anhydrous calcium chloride A and B. Each of these samples was treated for 8 hours with a gaseous mixture. The gaseous mixture was prepared by passing chlorine gas through carbon tetrachloride at a temperature of 24° C. at atmospheric pressure, the ratio of chlorine to carbon tetrachloride in the gaseous mixture was about 8.1. Sample A was treated at a temperature of 599° C. and sample B was treated at a temperature of 550° C. The following table shows the analysis of samples A and B before and after treatment and in which N. D. means not detectable.

| Sample | Chemical Analysis, Percent | | | | | |
|---|---|---|---|---|---|---|
| | Si | B | C | O | Al | Fe |
| A (before treatment) | 0.004 | 0.12 | 0.11 | 0.031 | 0.001 | 0.015 |
| A (after treatment) | 0.0015 | 0.0002 | N. D. | <0.01 | 0.0007 | 0.0015 |
| B (before treatment) | 0.005 | 0.13 | 0.15 | 0.033 | 0.0012 | 0.021 |
| B (after treatment) | 0.001 | 0.0006 | 0.08 | <0.01 | 0.001 | 0.017 |

While the invention is directed particularly to the purification of calcium chloride it is applicable for the purification of other alkaline earth metal chlorides and other halides thereof and the alkali metal halides, such as the bromides, fluorides, iodides and chlorides of barium, strontium, lithium, sodium, potassium, etc. by treatment with a mixture of the halogen and carbon tetrahalide corresponding to the metal halide being treated.

I claim:
1. The method of treating impure calcium chloride to remove impurities which comprises heating the calcium chloride to render it anhydrous, and then heating the anhydrous material for at least about 1 to 4 hours at a temperature between about 425° C. and 650° C. in intimate contact with a gaseous medium consisting essentially of chlorine and carbon tetrachloride under a pressure slightly greater than one atmosphere, the minimum required ratio of chlorine to carbon tetrachloride by volume in the gaseous medium depending upon the temperature used and varying from a minimum ratio of about 1 to 2 at a temperature of about 425° C. to a minimum ratio of about 15.5 to 1 at a temperature of about 650° C.

2. The method of treating impure calcium chloride to remove impurities which comprises heating the calcium chloride to render it anhydrous, establishing a fluosolids layer comprising said anhydrous calcium chloride in finely divided form in suspension in a gaseous medium consisting essentially of chlorine and carbon tetrachloride under a pressure slightly greater than one atmosphere, and heating the material in said fluosolids layer for at least about 1 to 4 hours at a temperature between about 425° C. and 650° C., the minimum required ratio of chlorine to carbon tetrachloride by volume in the gaseous medium depending upon the temperature used and varying substantially directly from a minimum ratio of about 1 to 2 at a temperature of about 425° C. to a minimum ratio of about 15.5 to 1 at a temperature of about 650° C.

3. The method of treating impure calcium chloride to remove impurities which comprises establishing a first fluosolids layer comprising the impure calcium chloride in finely divided form in suspension in a gaseous medium consisting essentially of chlorine and carbon tetrachloride under a pressure slightly greater than one atmosphere, heating the material in said fluosolids layer to render the calcium chloride anhydrous, establishing a second fluosolids layer comprising said anhydrous calcium chloride in finely divided form in suspension in a gaseous medium consisting essentially of chlorine and carbon tetrachloride under a pressure slightly greater than one atmosphere heating the material in said second fluosolids layer for at least about 1 to 4 hours at a temperature between about 425° C. and 650° C., and continuously introducing said gaseous medium into said second fluosolids layer at a controlled rate and permitting it to pass therefrom through said first fluosolids layer, the minimum required ratio of chlorine to carbon tetrachloride by volume depending upon the maximum temperature used and varying substantially directly from a minimum ratio of about 1 to 2 at a temperature of about 425° C. to a minimum ratio of about 15.5 to 1 at a temperature of about 650° C.

References Cited in the file of this patent

UNITED STATES PATENTS

| 2,636,807 | Ross et al. | Apr. 28, 1953 |
| 2,646,343 | Bennett et al. | July 21, 1953 |

FOREIGN PATENTS

| 111,313 | Great Britain | Oct. 19, 1917 |